United States Patent Office 3,480,621
Patented Nov. 25, 1969

3,480,621
STEROID KETAL
Bjarte Loken, Santurce, Puerto Rico, and Marcel Gut, Worcester, Mass., assignors to Phytogen Products, Inc., Mamaroneck, N.Y., a corporation of Delaware
No Drawing. Filed Jan. 17, 1967, Ser. No. 609,736
Int. Cl. C07c *173/00, 167/30;* A61k *27/00*
U.S. Cl. 260—239.55     7 Claims

ABSTRACT OF THE DISCLOSURE

The present application is directed to certain novel steroids, identifiable as the 20-ketals of 21-halo pregnan-20-ones. These compounds are active estrogen antagonists.

---

The present invention relates to 20-ethylene dioxy-21-halo pregnan-20-ones. The compounds of the present invention possess a selective antiestrogenic activity.

The compounds of the present invention can be represented by the following structural formulae:

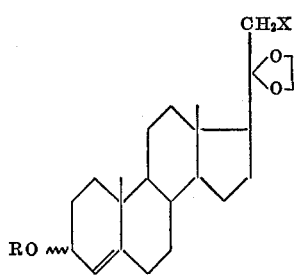

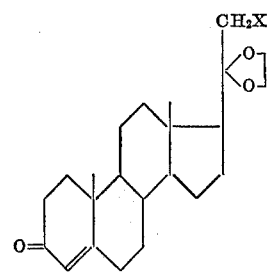

Wherein, X is Br, F or Cl, and wherein the cyclic ketal in the 20-position is ethylenedioxy, 1,2-propylene dioxy, 1,2- or 2,3-butylenedioxy and wherein R which is H or lower acyl, may be either the 3-α or the 3-β epimer.

The present compounds have a somewhat unusual biological performance profile. They show no progestational, androgenic, or estrogenic activity. On the other hand the compounds are active estrogen antagonists, exhibiting marked antiestrogenicity. Accordingly, administration of these compounds e.g. orally, subcutaneously, etc., suppresses estrogen action selectively without at the time interfering with the progestational or the androgenic systems. Such specificity is somewhat unusual since a progestational hormone often is antiestrogenic; an estrogen often shows antiandrogenicity, etc. Thus, the present compounds might be employed to cut back estrogen metabolism. They might also form part of hormone therapy treatment as for example be included to provided an exclusive progestational effect for compounds like the 19-nor derivatives which alone exhibit estrogenicity.

The compounds of the present invention may be synthesized from the corresponding 21-haloprogesterone by ketalization in glycol benzene solution in the presence of p-toluenesulfonic acid catalyst, at elevated (boiling) temperatures, the by-product water being azeotropically removed overhead. This reaction forms the 21-halo progesterone-3, 20-bis-ethylene ketal. If desired the 3-monoketals may first be formed by transketalizing 21-haloprogesterone with 2-methyl-2-ethyl-1, 3-dioxolane in the presence of p-toluenesulfonic acid according to the procedure described by H. F. Dauben, Jr., B. Löken, H. J. Ringold, J. American Chemical Society, 76, 1359 (1954) or according to the modification proposed in Patent 2,925,415 by B. Löken and the 3-monoketal then reacted in glycol benzene solution in presence of p-toluenesulfonic acid.

The 3,20-bis-ketal may then be hydrolized by conventional ketal hydrolysis techniques to give the 20-monoketal. Surprisingly, virtually no hydrolysis occurs at the 20-position.

Alternatively, the 20-monoketal can be prepared from 21-halo-pregnenolone acetate by way of the 20-ketal of 21-halo-$\Delta^5$-pregnenolone, which then via an Oppenauer oxidation (R. V. Oppenauer, Rec. trav, 56, 137, (1937)) may be converted to the appropriate $\Delta^4$-3-ketone structure. The corresponding $\Delta^4$-3-OH derivatives may be obtained directly from the $\Delta^4$-3-ketone derivatives by metal hydride reduction.

The ethylene dioxides are the preferred ketals because they are prepared in the best yields, are stable and have a well characterized physical behavior. For example the ethylene ketals crystallize well and are easily obtained in a pure state. The 21 Cl and 21 F derivatives are preferred over the Br, 21 I. In addition the 3-OH and 3-acetate compounds are preferred with there being no significant difference between the α and β epimers in biological performance.

The above described methods for preparing the compounds of the present invention are further illustrated in the following formulae sequence:

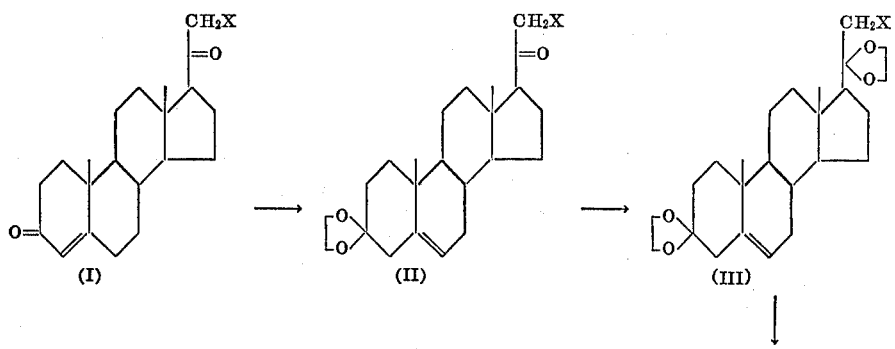

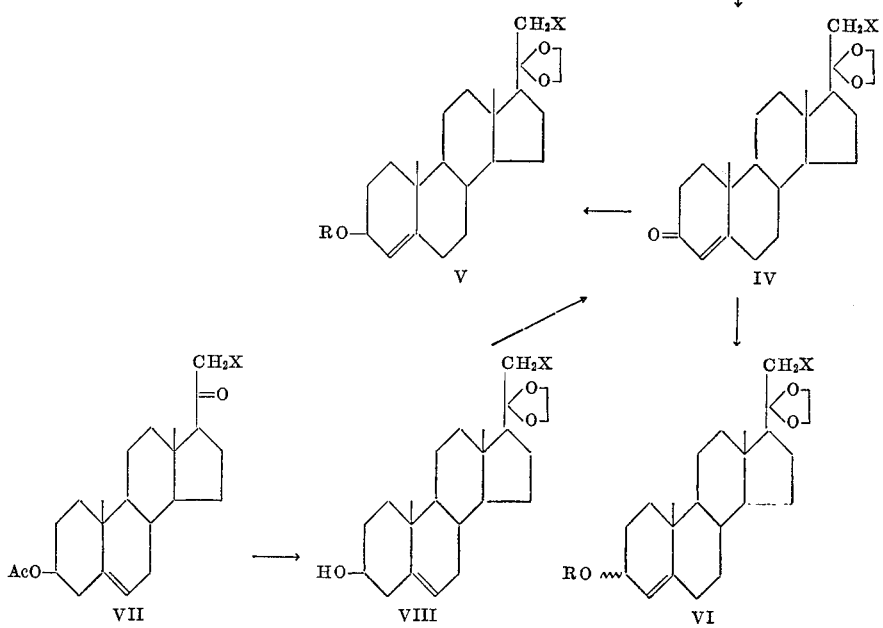

The present invention is further described in the examples which follow, which examples are intended to be considered as illustrative only and not as limiting the invention in spirit or scope.

EXAMPLE I 3-ethylenedioxy-21-fluoropregn-5-en-20-one

A solution of 9.5 parts of 21-fluoroprogesterone (I) and 0.15 part of p-toluenesulfonic acid monohydrate in 300 parts of 2-methyl-2-ethyl-1,3-dioxolane was heated in a 500 ml. flask equipped with a packed column having a total reflux partial take-off head corresponding to about 40 theoretical plates when under total reflux. The solution was heated to boiling and maintained at a reflux ratio of approximately 1:6 for 2 hours, and then 1:60 overnight (16 hrs.). Initially the temperature at the top of the column was 79°, corresponding to the boiling point of the butanone formed by the exchange dioxolanation reaction, and removed overhead. The end point of the exchange reaction was indicated when the boiling point at the top of the column reached 116°, the boiling point of 2-methyl-2-ethyl-1,3-dioxolane.

The reaction mixture was cooled, transferred to a separatory funnel and washed twice with 100 parts of 2 N aqueous sodium carbonate solution. The 2-methyl-2-ethyl-1,3-dioxolane layer was dried over anhydrous potassium carbonate and concentrated to dryness in vacuo. The crystalline residue was suspended in ether and filtered. For purification the crystals were transferred to a Soxhlet thimble and extracted exhaustively with di-ethyl ether. Then the extract concenrated to a small volume. 8.4 parts of the 3-monoethylene ketal (Compound II) in the form of colorless prisms were obtained, M.P. about 188–190.5°; $[\alpha]_D^{25}$, +53° (chloroform).

EXAMPLE II 3.20-bis-ethylenedioxy-21-fluoro-pregn-5-en

To a solution of 8.3 parts of the monoketal product of Example I in 250 parts of benzene, was added 30 parts ethylene glycol and 0.4 part of p-toluenesulfonic acid monohydrate. The mixture was refluxed in a one liter flask equipped with a Dean-Stark water trap for 24 hrs. The reaction mixture was cooled to room temperature and transferred to a separatory funnel charged with 500 parts 2 N aqueous sodium carbonate solution.

The washing with sodium carbonate solution was repeated with an additional 200 parts of solution, and the benzene extract then was dried over anhydrous potassium carbonate and concentrated to dryness in vacuo. The crystalline residue was triturated with 50 parts of ether, cooled and filtered. There was obtained 7.18 parts of crude bis-ketal (III) which after recrystallization from ether displayed; M.P. 170–171°; $[\alpha]_D^{25}$, —3°.

EXAMPLE III 20-ethylenedioxy-21-fluoropregn-4-en-3-one

A solution of 5 parts of the 21-fluoroprogesterone bis-ethylene ketal product of Example II and 0.5 part of p-toluenesulfonic acid monohydrate in 125 parts of acetone was left for a period of 7 hrs. at 26° C. and then for 12 hrs. at 12° C., by which time some crystals had separated. A solution of 18 parts of 2 N sodium carbonate in 70 parts of water was added slowly, causing a heavy crystalline precipitate. The crystals were filtered, washed with acetone-water 6:4, collected and dried. This material was recrystallized from the ether which effectively removed the inorganic salt contamination and gave 4.02 parts of the 20-monoketal (IV), M.P. 152–153°. The purified sample was obtained by recrystallization from methanol and showed: M.P. 156.5–157.5°; $[\alpha]_D^{25}$, +111.5° (Chlf.).

EXAMPLE IV 20-ethylenedioxy-21-chloropregn-4-en-3-one

To a solution of 7.5 parts of 21-chloroprogesterone (I) in 250 parts of benzene was added 30 parts ethylene glycol and 0.4 part of p-toluenesulfonic acid monohydrate. The mixture was refluxed in a one liter flask equipped with a Dean-Stark water trap for 20 hrs. The reaction mixture was cooled and washed twice with 250 parts of an aqueous 2 N sodium carbonate solution. The resulting benzene extract was separated, dried over potassium carbonate (anhydrous), and concentrated to dryness under reduced pressure. This crystalline residue was dissolved in 175 parts of acetone and 0.7 part of p-toluenesulfonic acid monohydrate was added, and the mixture allowed to stand at room temperature overnight. A solution of 25 parts of 2 N aqueous sodium carbonate solution in 105 parts of water was added slowly, giving rise to the formation of a crystalline slurry. The crystals were filtered, washed with water, collected and dried. After recrystallization from methanol the pure 20-monoketal (III) was obtained (5.1 parts). The most salient bands in the infrared spectrum were:

$\lambda_{max.}^{KBr}$: 6.00, 6.20, 8.15, 8.44, 9.5, 10.50 and 10.87µ.

EXAMPLE V 20-ethylenedioxy-21-bromopregn-4-en-3-one

Substituting 7.5 parts of 21-chloroprogesterone for 7.2 parts of 21-bromoprogesterone and otherwise following exactly the reaction details described in Example IV, gave 2.0 parts of 20-ethylenedioxy-21-bromopregn-4-en-3-one, the lower yield being attributed to the lesser stability of the 21-bromo-20-oxo-moiety during ketalization as compared with the corresponding 21-fluoro and 21-chloroderivatives.

EXAMPLE VI 20-ethylenedioxy-21-fluoropregn-4-en-3β-ol

To a stirred ice cold suspension of 1.25 parts lithium aluminum hydride in 125 parts of anhydrous ether under argon was added slowly a solution of 3.75 parts of 21-fluoroprogesterone 20-ethylene ketal (Example III) in 45 parts of tetrahydrofurane and 45 parts ether. After completion of the addition, the mixture was refluxed for 1 hour. Excess hydride was destroyed by cautious addition of ethyl acetate. A saturated aqueous sodium sulfate solution was added in small portions, until the precipitate started to cling to the bottom and sides of the flask. A little anhydrous sodium sulfate was added, and the almost clear supernatant was decanted through a filter. The remaining solids were reextracted three times with warm ether and filtered. The combined filtrates were evaporated to dryness under reduced pressure, and the residue was crystallized by trituration with ether. The crystals were filtered, washed with ether, collected and dried. Recrystallization from ether gave 2.44 g. of the pure 3β-hydroxyepimer (VI) M.P. 175–177°; $[\alpha]_D^{25}$, +57.5° (chloroform). This substance was found to be homogenous when chromatographed (benzene/ethyl acetate, 8:2) on a thin layer plate. The mother liquors from the first and second crystallization were saved for obtaining the 3α-hydroxyepimer (Example VII).

EXAMPLE VII 20-ethylenedioxy-21-fluoropregn-4-en-3α-ol

The mother liquors from the crystallization of the 3β-hydroxyepimer (Example VI, above) were combined, evaporated to dryness and dissolved in the minimum amount of hot methanol. Slow cooling gave 0.25 part of crystals showing M.P. 158–159.5°; $[\alpha]_D^{25}$, +89.1°. One additional recrystallization from methanol gave the pure sample M.P. 161–162.5°; $[\alpha]_D^{25}$, +89.6° (chloroform). Thin layer chromatography showed this substance to be homogenous.

EXAMPLE VIII (a) 20-ethylenedioxy-21-fluoropregn-4-en-3β-ol acetate

A solution of 6 parts of 20-ethylenedioxy-21-fluoropregn-4-en-3β-ol in 15 parts of pyridine and 10 parts of acetic anhydride was left at ambient temperature (25°) for 20 hours. Slow water addition gave a crystalline slurry which was cooled, filtered, washed on the filter with water and dried. In this manner 6.4 parts of almost pure acetate was obtained, M.P. 129–131.5°. Recrystallization from methanol raised the M.P. to 131.5–132°; $[\alpha]_D^{25}$, +17° (chloroform).

(b) 20-ethylenedioxy-21-fluoropregn-4-en-3α-ol acetate

The 3α-hydroxyepimer can be acetylated following the procedure of Example VII above. However, because of higher solubility of the 3α-acetoxyepimer the following procedure is better:

A solution of 1.1 part of 20-ethylenedioxy-21-fluoropregn-4-en-3α-ol in 5.5 parts of dry pyridine and 2.2 parts of acetic anhydride was left at room temperature for 20 hours. 0.45 part of water was added and after 1 hour, the product was precipitated by pouring the reaction mixture into 250 parts of water. The slurry was filtered, and the micro crystalline solids washed well with water, dried and recrystallized twice from aqueous methanol. In this manner 0.85 part of pure product was obtained M.P. 106.5–108°; $[\alpha]_D^{25}$, +100° (chloroform).

EXAMPLE IX 20-ethylenedioxy-21-chloropregn-4-en-3ξ-ol

A solution of 0.5 part of sodium borohydride in 4 parts of water was added to 10 parts of 21-chloroprogesterone-20-ethylene ketal (Example IV) dissolved in 400 parts of tetrahydrofuran. After about 24 hours at room tempertaure, the excess reagent was destroyed by addition of 0.1 part of acetic acid, and the solution was concentrated under reduced pressure almost to dryness. Water was added to the residue and the solids collected to furnish 9 to 9.5 parts of 3-hydroxyepimeric mixture. This mixture could not be resolved into the pure 3α and 3β-hydroxyepimers by a simple fractionated crystallization as could the 21-fluoroderivative. Chromatography on a column of silica gel was necessary for a sharp separation of the two epimers. The infrared spectrum of the 3β-epimer:

$\lambda_{max.}^{KBr}$: 2.95, 6.05, 9.48, 9.92, 10.44µ

The 3α-epimer had a very similar spectrum but some bands particularly the hydroxy band were displaced: 3.07, 6.02, 8.92, 9.45, 9.80, 10.40µ.

For biological application it was not necessary to separate the epimers, as the mixture showed the same activity.

EXAMPLE X 20-ethylenedioxy-21-chloropregn-5-en-3β-ol acetate

A solution of 6 parts of 3β-acetoxy-21-chloropregn-5-en-20-one (VII) and 0.1 part of p-toluenesulfonic acid monohydrate in 700 parts of benzene and of 80 parts of ethylene glycol was refluxed overnight in a flask equipped with a Dean-Stark separator. The mixture was cooled, extracted twice with 2 N aqueous sodium carbonate solution, and the benzene extract was evaporated to dryness under reduced pressure. The crystalline residue was recrystallized from methanol, then from acetone to give 3.95 parts of crystals, M.P. 168–170°; $[\alpha]_D^{25}$, −34°.

EXAMPLE XI 20-ethylenedioxy-21-chloropregn-4-en-3-one

A solution of 2 parts of the 20-ethylenedioxy-21-chloropregn-5-en-3β-ol acetate (from Example X). 100 parts of methanol and 10 parts of aqueous sodium hydroxide solution was refluxed for one hour under an atmosphere of argon. Addition of 30 parts of water caused a heavy microcrystalline precipitate. This free 3β-hydroxy substance (VIII) was extracted with toluene (100 parts), and the inorganics as well as methanol were removed from the toluene extract by three washings with water (50 parts each time). The toluene extract was evaporated at barometric pressure to a volume of 50 parts, 10 parts of freshly distilled cyclohexanone added, and then approximately 10 parts of solvent mixture was distilled to remove moisture.

A solution of 1 part of aluminum isopropylate in 20 parts toluene was added and the mixture was allowed to distill very slowly for 1 hour. During this period a total of 22 parts of distillate was collected. The mixture was allowed to cool and was extracted with 2 N aqueous sulfuric acid, and the organic layer was washed with water to neutrality. The extract was concentrated under reduced pressure and the oily residue distilled to dryness twice after addition of 20 parts of water each time. To the residue was added 20 parts of hexane, and the resulting crystals were filtered and recrystallized from ether to give 1.1 part of the 21-chloroprogesterone-20-ethylene ketal (IV) in all aspects identical with the 20-monoethylene ketal prepared from the 3.20-bis-ketal (Example IV).

EXAMPLE XII 20-ethylenedioxy-21-fluoropregn-5-en-3β-ol acetate

Following the procedure of Example X, 6 parts of 3β-acetoxy-21-fluoropregn-5-en-20-one was converted to 4.1 parts of the 20-ethylene ketal, M.P. 177–179.5°; $[\alpha]_D^{25}$, −42° (Chlf.).

EXAMPLE XIII 20-ethylenedioxy-21-fluoropregn-5-en-3β-ol

A solution of 0.175 part of the 3β-acetoxy derivative of Example XII, above, 10 parts of methanol and 1 part of 1 N aqueous sodium hydroxide was refluxed for 1 hour under nitrogen. Total precipitation was obtained when 20 parts of water was added. The solids were filtered and recrystallized from dichloromethane-methanol, yielding 0.14 part of the free alcohol, M.P. 190–192°; $[\alpha]_D^{25}$, −33.5° (Chlf.).

EXAMPLE XIV 20-ethylenedioxy-21-fluoropregn-4-en-3-one

A solution of 10 parts of 20-ethylenedioxy-21-fluoropregn-5-en-3β-ol in 275 parts of toluene and 60 parts of cyclohexanone was distilled to remove moisture. About 20 parts of solvent mixture was distilled for this purpose. A solution of 4.5 parts of aluminum isopropylate in 25 parts of toluene was added (during 5 minutes) to the slowly distilling mixture. The reaction was maintained under slow distillation for a period of 50 minutes, during which a total of 40 parts of distillate was collected. The mixture was cooled, extracted with 2 N aqueous sulfuric acid, and the organic layer was washed with water until neutral. The neutral extract was evaporated under reduced pressure, and the oily residue distilled to dryness twice after addition of 50 parts of water each time. To the residue was added 40 parts of hexane and the resulting crystals were filtered and recrystallized from ether to give 8.0 parts of product, M.P. 155–157°. This compound was found to be identical in all aspects with the 20-monoethylene ketal prepared from the 3.20-bis-ketal (Example III).

What is claimed is:
1. A compound selected from the group consisting of:

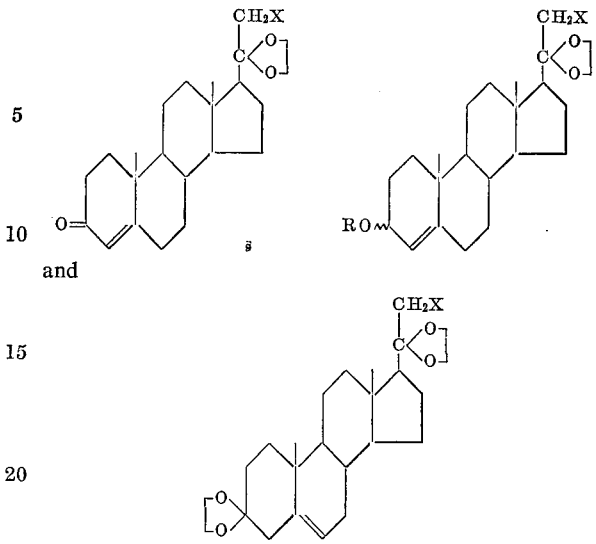

where X is F, Cl or Br and R is H or lower acyl.

2. A compound according to claim 1 comprising 20-ethylenedioxy-21-chloropregn-4-en-3-one.
3. A compound according to claim 1 comprising 20-ethylenedioxy-21-fluoropregn-4-en-3-one.
4. A compound according to claim 1 comprising 20-ethylenedioxy-21-chloropregn-4-en-3-ol.
5. A compound according to claim 1 comprising 20-ethylenedioxy-21-fluoropregn-4-en-3-ol.
6. A compound according to claim 1 comprising 20-ethylenedioxy-2-chloropregn-4-en-3-ol acetate.
7. A compound according to claim 1 comprising 20-ethylenedioxy-21-fluoropregn-4-en-3-ol acetate.

References Cited

UNITED STATES PATENTS 3,061,606  10/1962  Gut et al. _____ 260—239.55
3,141,877  7/1964   Fried _____ 260—239.55

OTHER REFERENCES

Marquet et al., Bull'n Soc. Chim. France, 1962, pp. 90–96.

Djerassi, Steroid Reactions, 1963 (Holden-Day, Inc.), p. 8.

LEWIS GOTTS, Primary Examiner

E. G. LOVE, Assistant Examiner

U.S. Cl. X.R.
260—397.47, 999